(12) United States Patent
Yao et al.

(10) Patent No.: US 12,720,365 B2
(45) Date of Patent: Aug. 25, 2026

(54) CLOUD EAS LIFECYCLE MANAGEMENT

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 18/390,517

(22) Filed: Dec. 20, 2023

(65) Prior Publication Data

US 2024/0121664 A1 Apr. 11, 2024

(51) Int. Cl.
*H04W 28/084* (2023.01)
*H04W 64/00* (2009.01)

(52) U.S. Cl.
CPC ....... *H04W 28/084* (2023.05); *H04W 64/003* (2013.01)

(58) Field of Classification Search
CPC .......................... H04W 28/084; H04W 64/003
See application file for complete search history.

(56) References Cited

U.S. PATENT DOCUMENTS

2022/0071138 A1* 3/2022 Eby .......................... A01H 5/10
2022/0110018 A1* 4/2022 Jha .................... H04W 74/0816
2022/0312255 A1* 9/2022 Kuwahara ............... H04W 4/70
2023/0094062 A1* 3/2023 Kim ........................ H04W 8/12
455/456.1
2023/0308951 A1* 9/2023 Zhang ................... H04W 28/14
2024/0373285 A1* 11/2024 Cai .................. H04W 28/0289

FOREIGN PATENT DOCUMENTS

DE 102021125097 A1 * 3/2022 ......... H04L 65/1016

OTHER PUBLICATIONS

Cisco Elastic Services Controller 5.1 (Year: 2020).*

* cited by examiner

*Primary Examiner* — Michael A Keller
*Assistant Examiner* — Thao D Duong
(74) *Attorney, Agent, or Firm* — Schwegman Lundberg & Woessner, P.A.

(57) ABSTRACT

An apparatus and system are provided to provide the progress and result of lifecycle management (LCM) processes of an edge application server (EAS) virtual network function (VNF) in a cloud. The lifecycle management process information is included in the Network Resource Models (NRMs). An identifier to identify the management service (MnS) consumer initiating the LCM process is included in an EASFunction Information Object Class (IOC), which represents properties of the EAS VNF, and another IOC, which represents requirements to deploy the EAS VNF. The IOC containing the LCM process information permits the consumer to correlate the LCM result with the LCM request. LCM solutions are presented to deploy and terminate EAS VNFs in the cloud using the LCM process information to report the progress and result of the LCM process.

17 Claims, 10 Drawing Sheets

CLOUD EAS LIFECYCLE MANAGEMENT

PRIORITY CLAIM

This application claims the benefit of priority to U.S. Provisional Patent Application Ser. No. 63/482,974, filed Feb. 2, 2023, which is incorporated herein by reference in its entirety.

BACKGROUND

Mobile communication has evolved significantly from early voice systems to highly sophisticated integrated communication platform. Next-generation (NG) wireless communication systems, including $5^{th}$ generation (5G) and sixth generation (6G) or new radio (NR) systems, are to provide access to information and sharing of data by various users (e.g., user equipment (UEs)) and applications. NR is to be a unified network/system that is to meet vastly different and sometimes conflicting performance dimensions and services driven by different services and applications. As such the complexity of such communication systems has increased. As expected, a number of issues abound with the advent of any new technology, including complexities related to lifecycle management (LCM) of an edge application server (EAS) implemented in the cloud.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
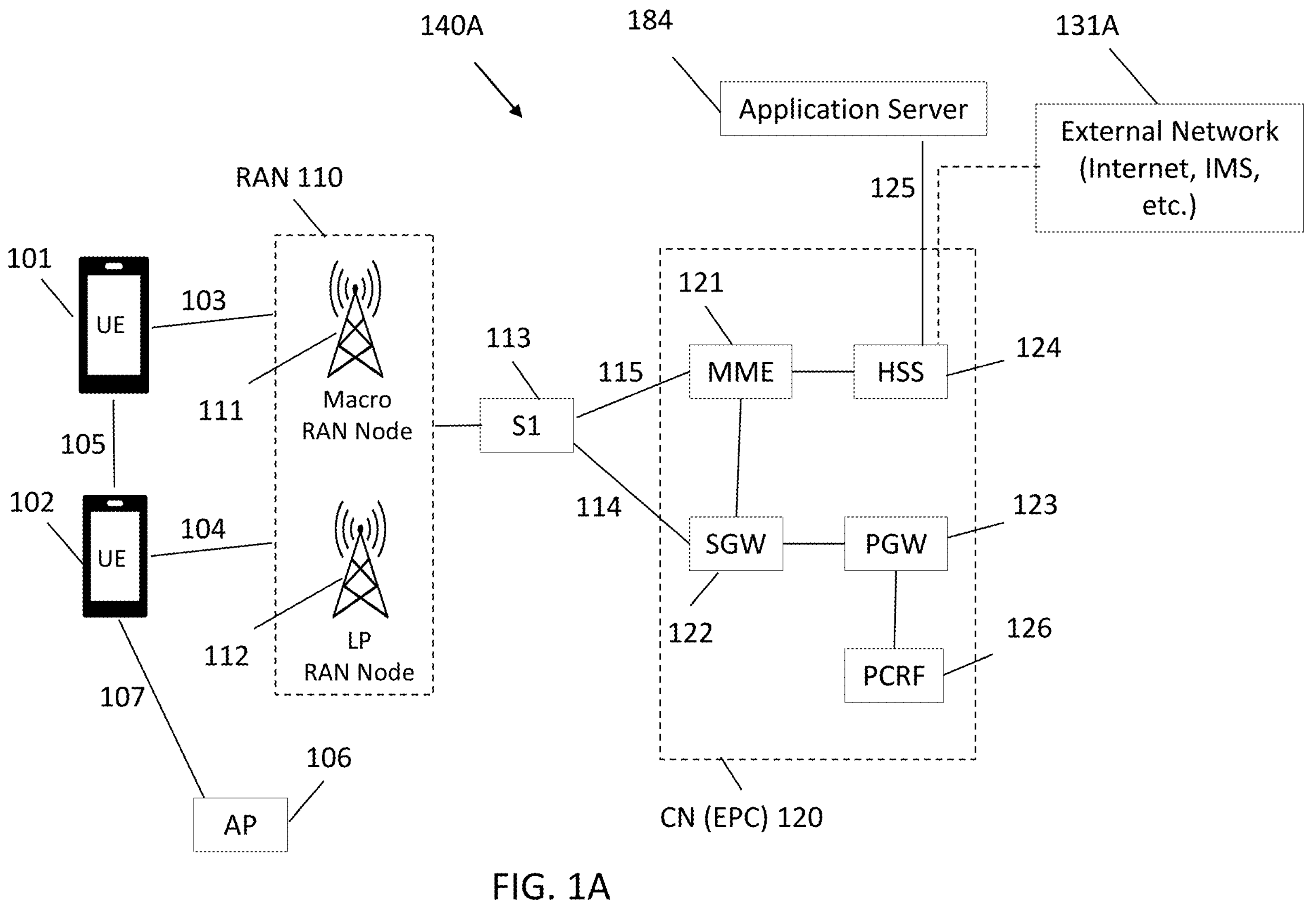
FIG. 1A illustrates an architecture of a network, in accordance with some aspects.

FIG. 1A illustrates an architecture of a network in accordance with some aspects. The network 140A includes 3GPP Long Term Evolution (LTE), $4^{th}$ generation (4G) and $5^{th}$ generation (5G) (or next generation (NG)) network functions that may be extended to 6G functions. Accordingly, although 5G will be referred to, it is to be understood that this is to extend as able to 6G structures, systems, and functions. A network function may be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 may be collectively referred to herein as UE 101, and UE 101 may be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and may be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a UMTS protocol, a 3GPP LTE protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) may be referred to as base stations (BSs), NodeBs, evolved NodeBs (eNBs), 5$^{th}$ Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 may be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and may be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 may be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A may be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF may be communicatively coupled to the gNBs and the NG-eNBs via NG interfaces. More specifically, in some aspects, the gNBs and the NG-eNBs may be connected to the AMF by NG-C interfaces, and to the UPF by NG-U interfaces. The gNBs and the NG-eNBs may be coupled to each other via Xn interfaces.

In some aspects, the NG system architecture can use reference points between various nodes. In some aspects, each of the gNBs and the NG-eNBs may be implemented as a base station, a mobile edge server, a small cell, a home eNB, and so forth. In some aspects, a gNB may be a primary node (MN) and NG-eNB may be a secondary node (SN) in a 5G architecture.

Figure 1B:
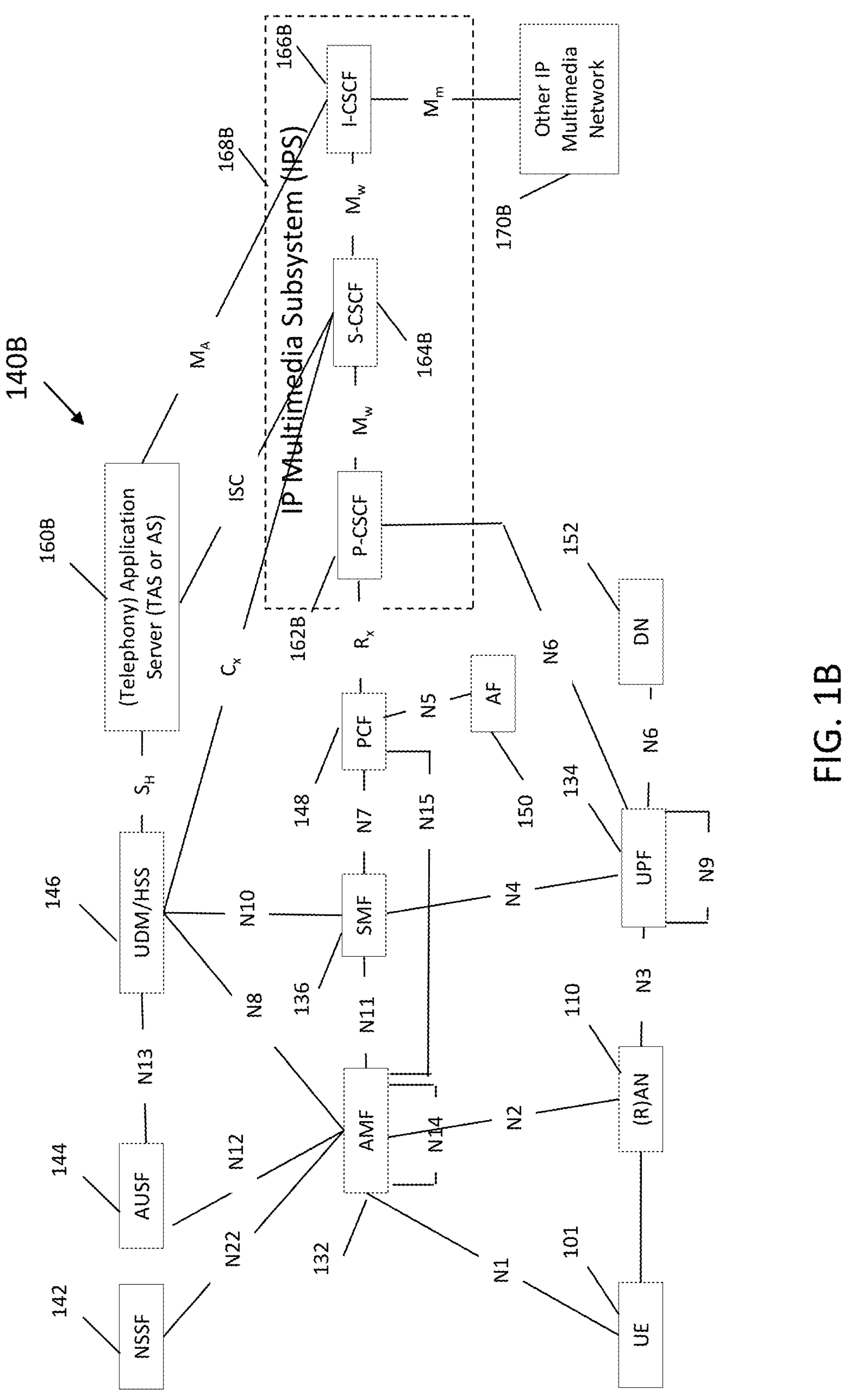
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 may be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 may be used to manage access control and mobility and can also include network slice selection functionality. The AMF 132 may provide UE-based authentication, authorization, mobility management, etc., and may be independent of the access technologies. The SMF 136 may be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 may be deployed in one or more configurations according to the desired service type and may be connected with a data network. The PCF 148 may be configured to provide a policy framework using network slicing, mobility management, and roaming (similar to PCRF in a 4G communication system). The UDM may be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162B, a serving CSCF (S-CSCF) 164B, an emergency CSCF (E-CSCF) (not illustrated in FIG. 1B), or interrogating CSCF (I-CSCF) 166B. The P-CSCF 162B may be configured to be the first contact point for the UE 102 within the IM subsystem (IMS) 168B. The S-CSCF 164B may be configured to handle the session states in the network, and the E-CSCF may be configured to handle certain aspects of emergency sessions such as routing an emergency request to the correct emergency center or PSAP. The I-CSCF 166B may be configured to function as the contact point within an operator's network for all IMS connections destined to a subscriber of that network operator, or a roaming subscriber currently located within that network operator's service area. In some aspects, the I-CSCF 166B may be connected to another IP multimedia network 170B, e.g., an IMS operated by a different network operator.

In some aspects, the UDM/HSS 146 may be coupled to an application server 184, which can include a telephony application server (TAS) or another application server (AS) 160B. The AS 160B may be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
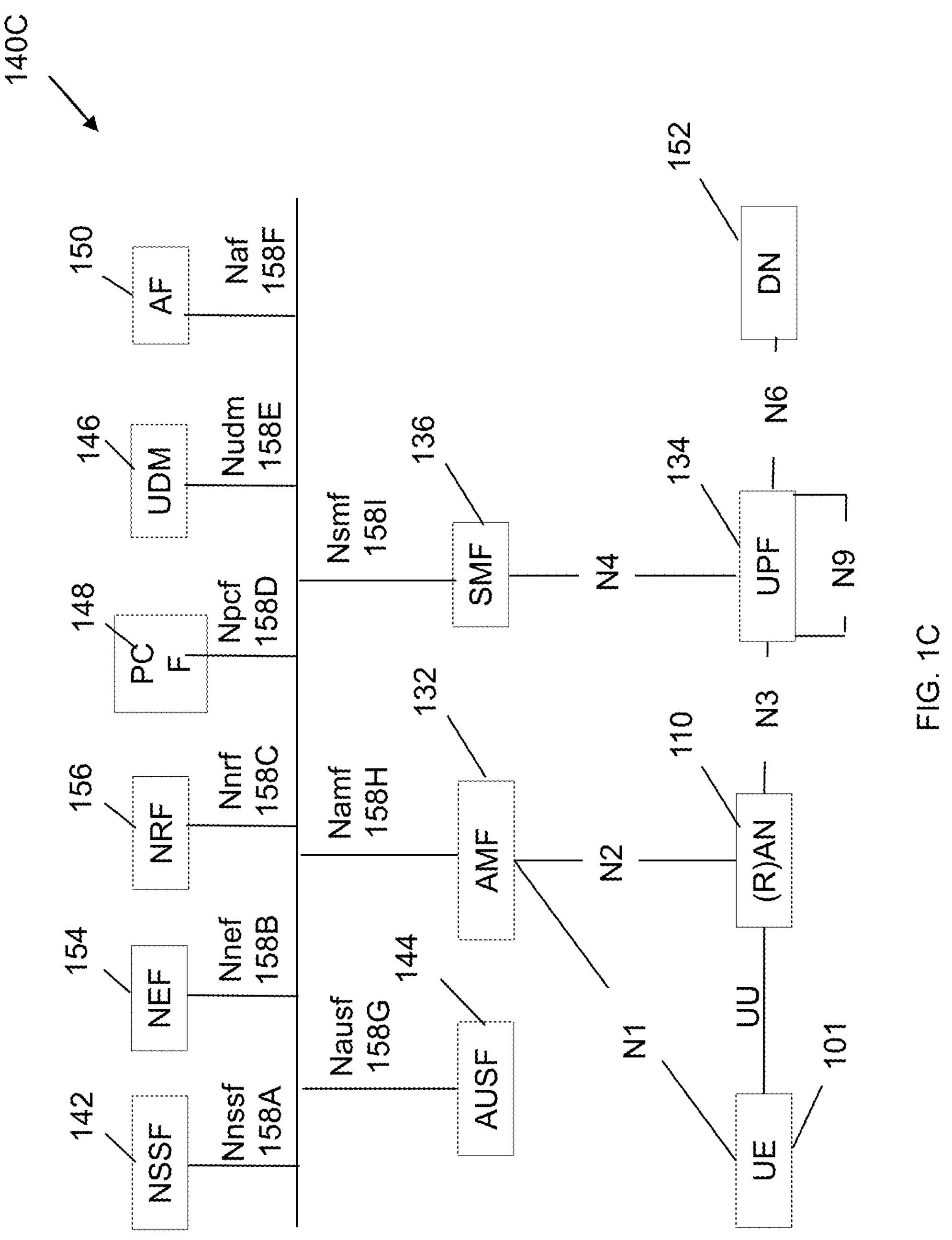
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures may be service-based and interaction between network functions may be represented by corresponding point-to-point reference points Ni or as service-based interfaces.

In some aspects, as illustrated in FIG. 1C, service-based representations may be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein may be used for supporting high reliability in distributed communication systems with dynamic topologies, including sidelink NR V2X communication systems.

Figure 2:
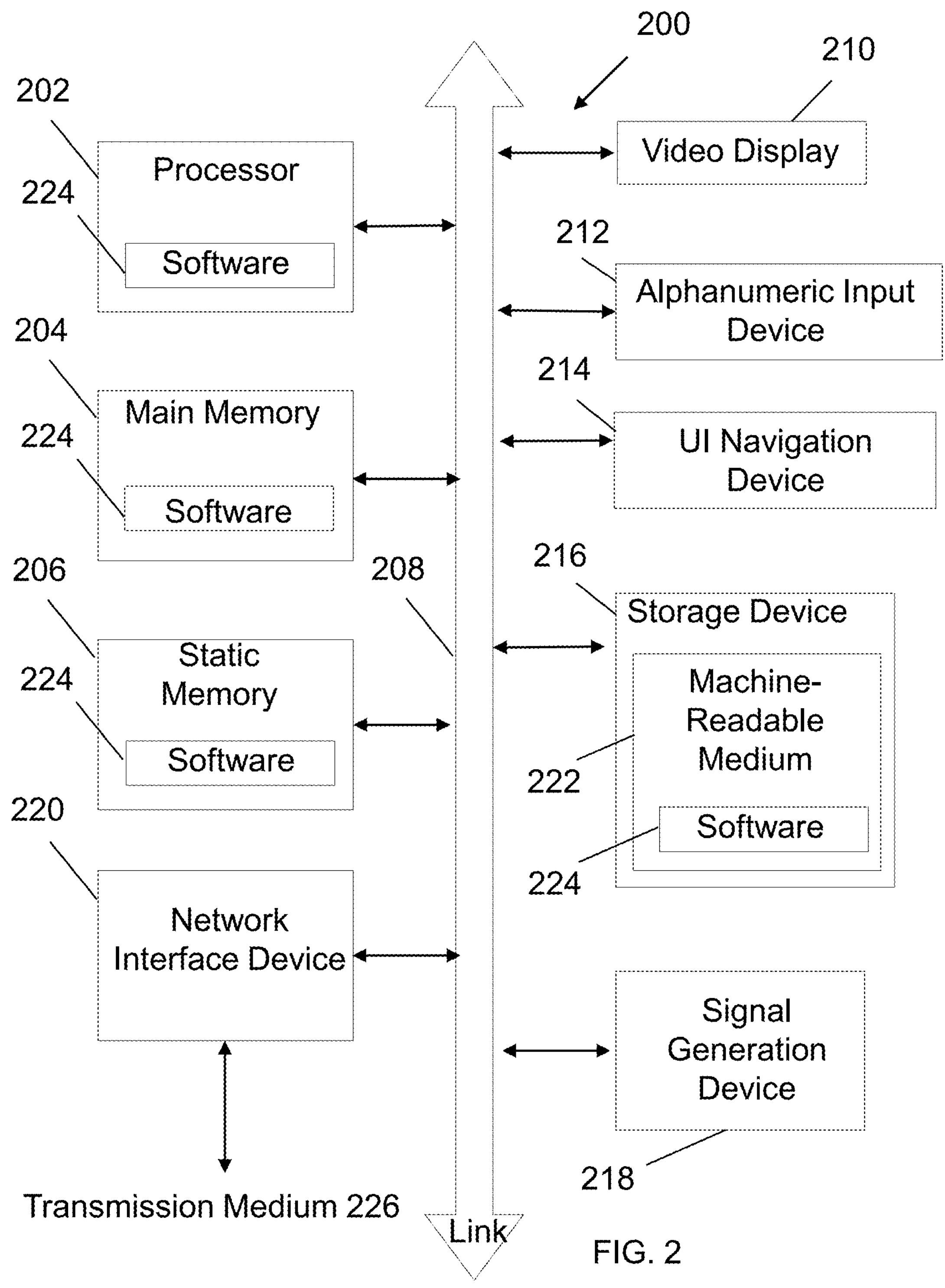
FIG. 2 illustrates a block diagram of a communication device in accordance with some aspects.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or another sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The non-transitory machine readable medium 222 is a tangible medium. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as IEEE 802.11 family of standards known as Wi-Fi, IEEE 802.16 family of standards known as WiMax, IEEE 802.15.4 family of standards, an LTE family of standards, a UMTS family of standards, peer-to-peer (P2P) networks, a 5G standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a GSM radio communication technology, a GPRS radio communication technology, an Enhanced Data Rates for GSM Evolution (EDGE) radio communication technology, and/or a Third Generation Partnership Project (3GPP) radio communication technology, for example UMTS, Freedom of Multimedia Access (FOMA), 3GPP LTE, 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), UMTS (3G), Wideband Code Division Multiple Access (UMTS) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), UMTS-Time-Division Duplex (UMTS-TDD), TD-CDMA, Time Division-Synchronous Code Division Multiple Access, 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), E-UTRA, LTE Advanced (4G), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), PTT, Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, Dedicated Short Range Communications (DSRC) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470

GHz to 5,725 GHz)), DSRC in Japan in the 700 MHz band (including 715 MHz to 725 MHz), IEEE 802.11bd based systems, etc.

Aspects described herein may be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include International Mobile Telecommunications spectrum as well as other types of spectrum/bands, such as bands with national allocation (including 450-470 MHz, 902-928 MHz (note: allocated for example in US (FCC Part 15)), 863-868.6 MHz (note: allocated for example in European Union (European Telecommunications Standards Institute (ETSI) EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band, but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme may be used on a secondary basis on bands such as the TV White Space bands (typically below 790 MHz) where in particular the 400 MHz and 700 MHz bands are promising candidates. Besides cellular applications, specific applications for vertical markets may be addressed such as Program Making and Special Events (PMSE), medical, health, surgery, automotive, low-latency, drones, etc. applications.

As above, one of the issues in a 5G network is LCM. Mobile operators have used LCM functions to deploy virtualized network functions (VNFs) in the cloud. ETSI network function virtualization (NFV) management and orchestration (MANO) has defined LCM operations to serve such purpose. However, 3GPPP SA5 has decided to reuse the existing provisioning management services (MnS) to support LCM. The createMOI operation in provisioning MnS used to create the managed object instances (MOI) has issues when used to instantiate VNFs. A first issue is that createMOI is a synchronous operation that requires consumers invoking the operation to wait for the result. This is not acceptable, as the instantiation of the VNFs in the virtualized environment (e.g., edge cloud) may take an extended amount of time. In addition, createMOI currently has no way to indicate instantiation failures that may have occurred due to various reasons, e.g., lack of cloud resources.

Figure 3:
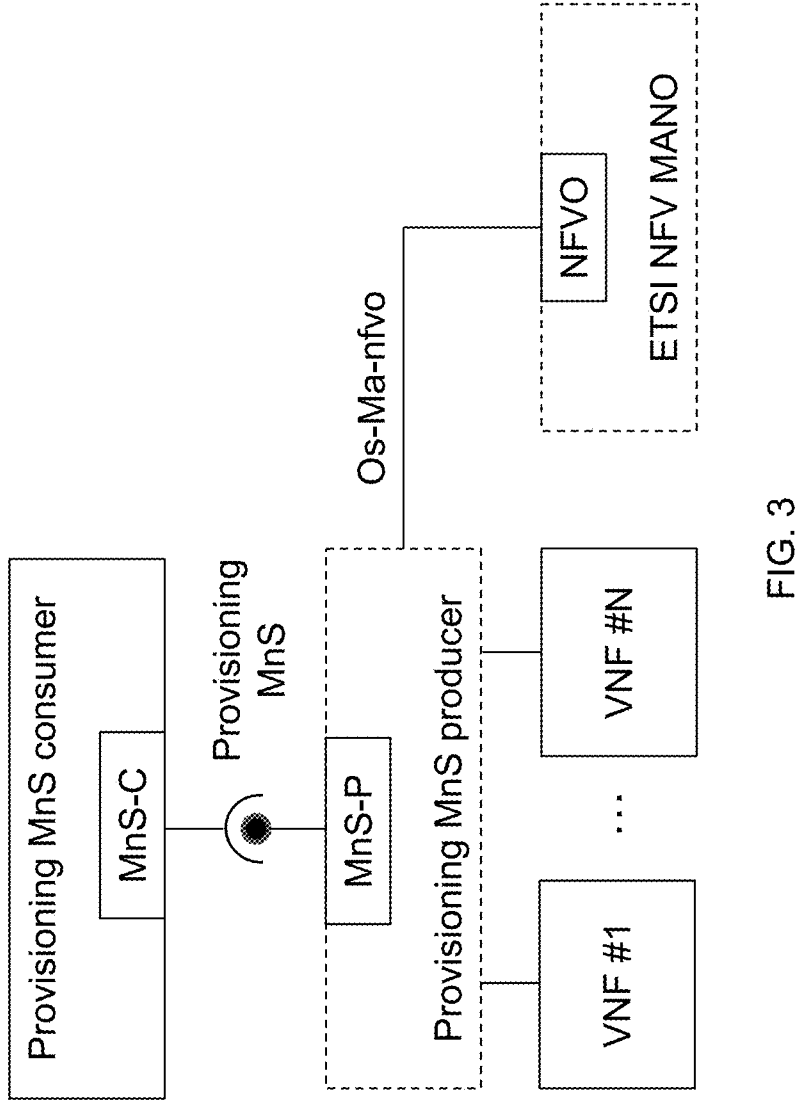
FIG. 3 illustrates a provisioning management service to support LCM in accordance with some embodiments.

FIG. 3 illustrates a provisioning management service to support LCM in accordance with some embodiments. The framework shown in FIG. 3 is of a provisioning management service where the MnS producer interfaces with the ETSI NFV MANO to support lifecycle management of VNFs. The LCM process Information Object Class (IOC) is defined herein, including the LcmProcess NRM fragment. A requestId is added to the EASRequirements IOC and EASFunction IOC to identify the MnS consumer initiating the LCM process. The requestID may be provided in the LcmProcess IOC, so the consumer is able to correlate the LCM result and the LCM request. LCM solutions are described to deploy and terminate VNFs in the cloud by using the LcmProcess IOC to report the progress and result of LCM process.

An IOC represents the management aspect of a network resource. It describes the information that can be passed/used in management interfaces. Their representations are technology agnostic software objects. IOC has attributes that represents the various properties of the class of objects. Furthermore, IOC can support operations providing network management services invocable on demand for that class of objects. An IOC may support notifications that report event occurrences relevant for that class of objects. It is modelled using the stereotype "Class" in the UML meta-model.

A managed object (MO) is an instance of a Managed Object Class (MOC) representing the management aspects of a network resource, which is also referred to as an MO instance (MOI). Its representation is a technology specific software object. The MOC is a class of such technology specific software objects. An MOC is the same as an IOC except that the former is defined in technology specific terms and the latter is defined in technology agnostic terms. MOCs are used/defined in SS level specifications. IOCs are used/defined in IS level specifications.

1) LCM Process IOC Definition

Figure 4A:
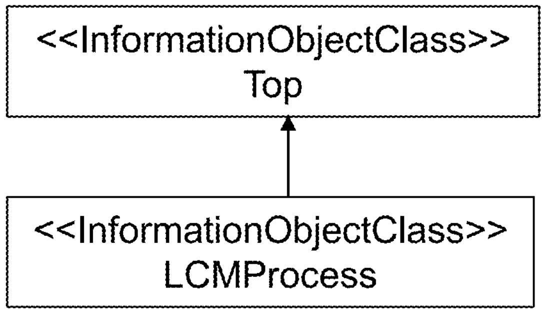
FIG. 4A illustrates an LCM Process Network Resource Model (NRM) fragment in accordance with some embodiments.
Figure 4B:
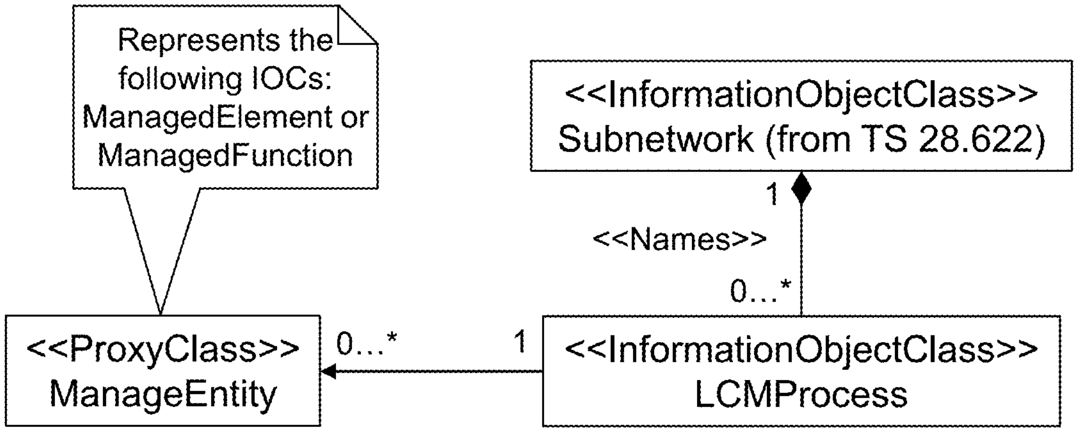
FIG. 4B illustrates an LCM Process NRM fragment in accordance with some embodiments.

FIG. 4A illustrates an LCM Process Network Resource Model (NRM) fragment in accordance with some embodiments. FIG. 4B illustrates an LCM Process NRM fragment in accordance with some embodiments. The LCMProcess IOC is added to TS 28.622. Each Managed Object is identified with a Distinguished Name (DN) according to 3GPP TS 32.300 that expresses its containment hierarchy.

4.3.x LcmProcess 4.3.x.1 Definition

This IOC represents a lifecycle management process. It can be name-contained by SubNetwork. This IOC is created during asynchronous LCM operations to notify consumers on the status of LCM operations.

4.3.x.2 Attributes

The LcmProcess IOC includes attributes inherited from Top IOC (defined in clause 4.3.29) and the following attributes:

| Attribute name | S | isReadable | isWritable | isInvariant | isNotifyable |
|---|---|---|---|---|---|
| lcmProc | M | T | F | T | T |
| requestId | M | T | T | F | T |

4.3.x.3 Attribute Constraints

None 4.3.x.4 Notifications

The common notifications defined in clause 4.5 are valid for this IOC.

| Attribute Name | Documentation and Allowed Values | Properties |
|---|---|---|
| lcmReqId | This attribute indicates the identifier of a request. | type: String multiplicity: 1 isOrdered: N/A isUnique: True default Value: None |

-continued

| Attribute Name | Documentation and Allowed Values | Properties |
|---|---|---|
| | | isNullable: False |
| lcmProc | The attribute indicates the status of LCM process. | Type: ProcessMinitor multiplicity: 1 isOrdered: N/A isUnique: N/A default Value: None isNullable: False |

2) Add requestId Attribute to EASRequirements IOC and EASFunction IOC in TS 28.538.

6.3 Class Definition 6.3.1 EASFunction 6.3.1.1 Definition

This IOC represent the properties of an EAS in a 3GPP network.

For more information about EAS, see 3GPP TS 23.558.

6.3.1.2 Attributes

The EASFunction IOC includes attributes inherited from ManagedFunction IOC (defined in TS 28.622) and the following attributes:

| | Support Qualifier | isReadable | isWritable | isInvariant | isNotifyable |
|---|---|---|---|---|---|
| Attribute name | | | | | |
| eASIdentifier | M | T | T | F | T |
| eASAddress | M | T | T | F | T |
| eESAddress | M | T | T | F | T |
| registrationInfo | M | T | T | F | T |
| requestId | M | T | F | F | T |
| Attribute related to role | | | | | |
| eASRequirements Ref | M | T | T | F | T |

6.3.2 EASRequirements 6.3.2.1 Definition

This represent the requirements needed to deploy EAS(s).

6.3.2.2 Attributes

The EASRequirements IOC includes attributes inherited from Top IOC (defined in TS 28.622) and the following attributes:

| Attribute name | Support Qualifier | isReadable | isWritable | isInvariant | isNotifyable |
|---|---|---|---|---|---|
| requiredEASservingLocation | M | T | F | F | T |
| softwareImageInfo | M | T | F | F | T |
| affinityAntiAffinity | M | T | F | F | T |
| serviceContinuity | M | T | F | F | T |
| virtualResource | M | T | F | F | T |
| requestId | M | T | F | F | T |

4.3.x.3 Attribute Constraints

None 4.3.x.4 Notifications

The common notifications defined in clause 4.5 are valid for this IOC.

| Attribute Name | Documentation and Allowed Values | Properties |
|---|---|---|
| requestId | This attribute indicates the identifier of a request. | type: String multiplicity: 1 isOrdered: N/A isUnique: True defaultValue: None isNullable: False |

Figure 5:
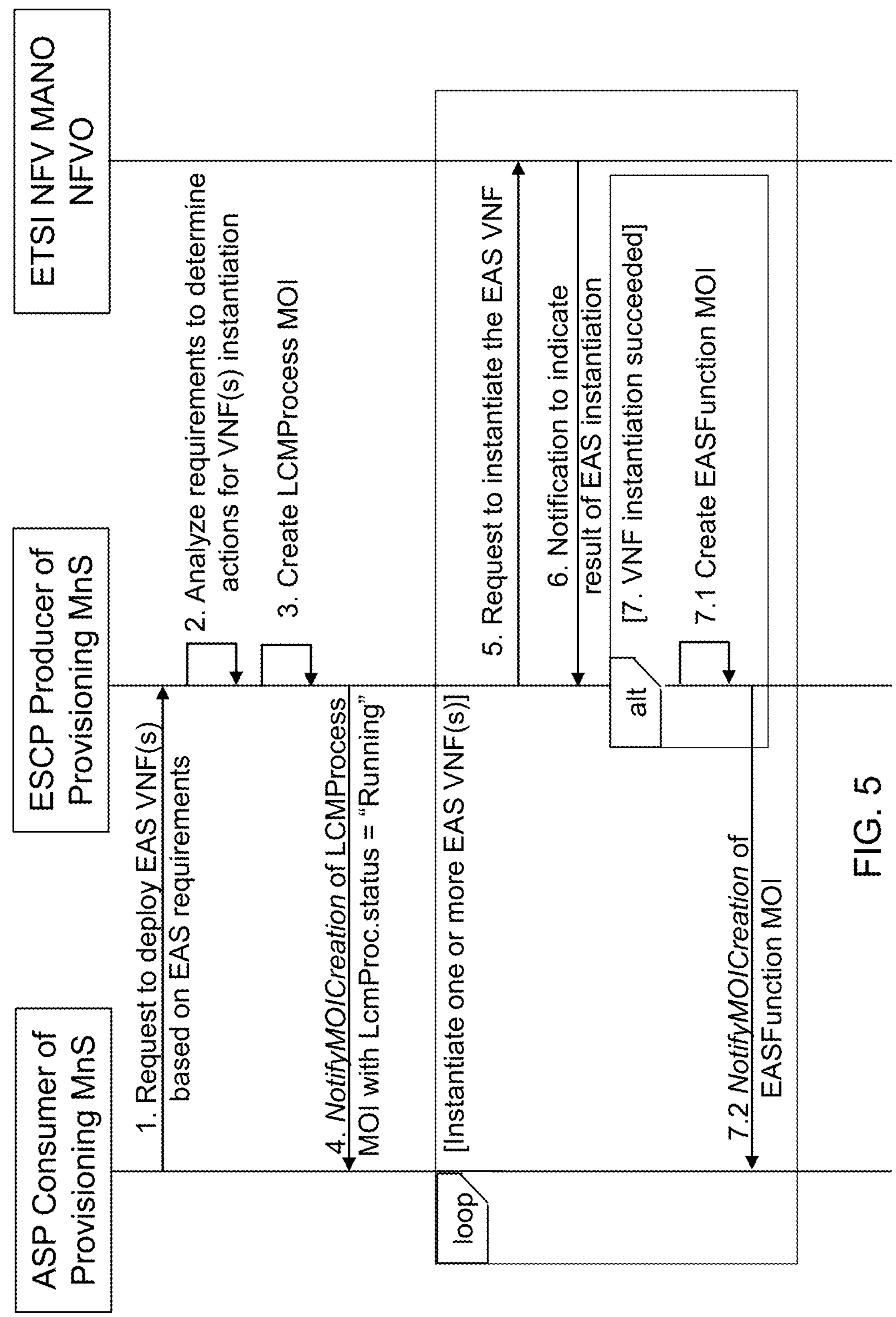
FIG. 5 illustrates EAS deployment in accordance with some embodiments.
Figure 5:
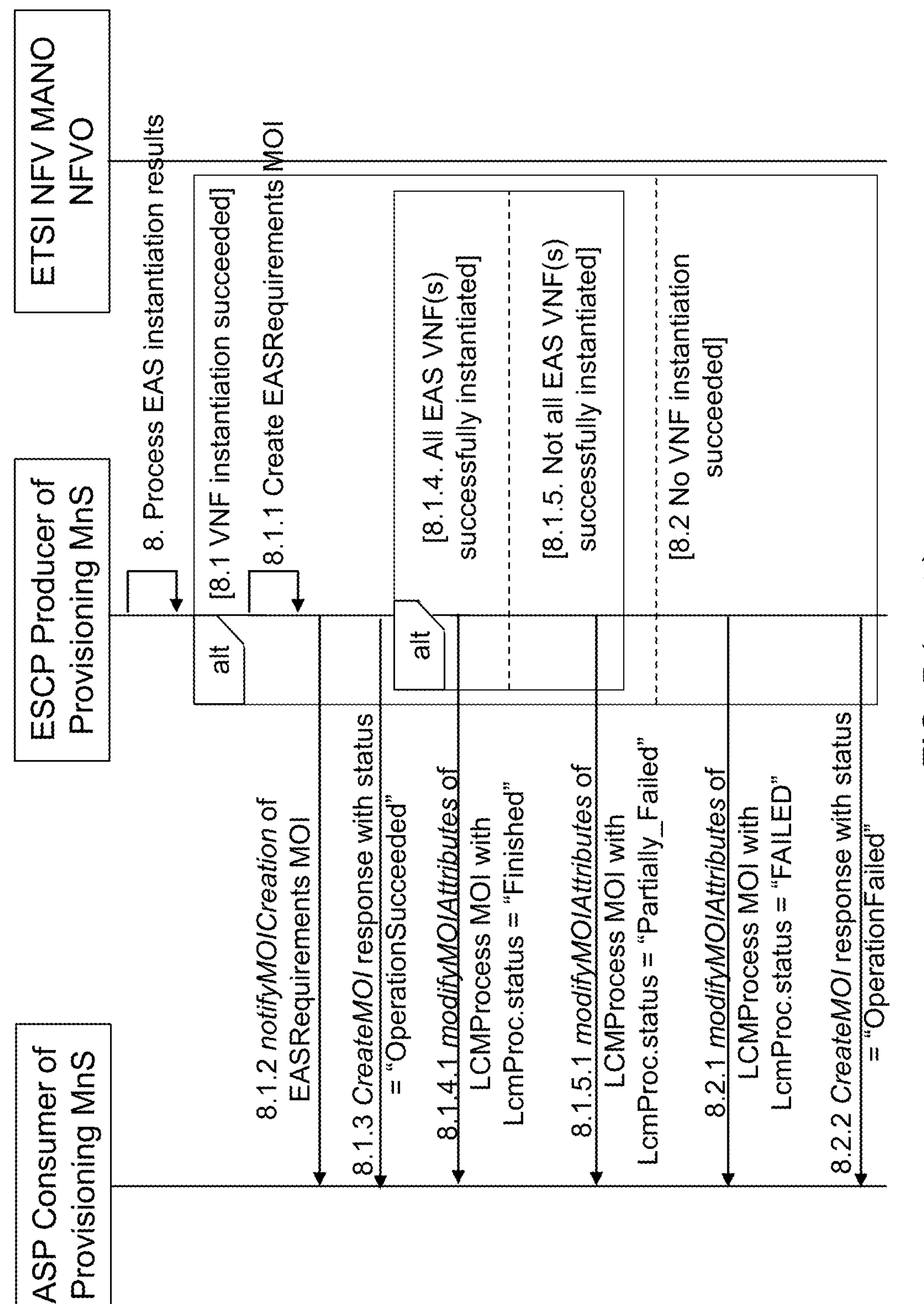

3) LCM Solutions to Deploy and Terminate VNFs in the Cloud 7.1.2 EAS Lifecycle Management 7.1.2.1 EAS Deployment FIG. 5 illustrates EAS deployment in accordance with some embodiments. The procedure in FIG. 5 describes how a consumer (shown as an application service provider (ASP) in the figures herein) is able to consume a provisioning MnS to instantiate the EAS. It is assumed that both the ASP and edge computing service provider (ECSP) consumers have subscribed to the producer of provisioning MnS to receive notifications.

As shown in FIG. 5, at operation 1, the ASP requests the ECSP provisioning MnS producer to start the EAS VNF instantiation by invoking the createMOI operation (see clause 11.1.1.1. in TS 28.532) for an EASRequirements IOC. The EASRequirements IOC contains the deployment requirements, including (but not limited to) the following attributes:

- the service areas (i.e., geographical, or topological) where the UEs can access the edge computing service (see clause 7.3.3 in TS 28.558);
- software image information and virtual resource information (e.g., software image location, minimum RAM, disk requirements) (see clause 7.1.6.5 and 7.1.9 in ETSI NFV IFA-011);
- Quality of Service (QoS) requirements (e.g., bandwidth, end-to-end latency);
- service continuity requirements (e.g., whether service continuity is required); and
- Affinity/Anti-affinity: the affinity and anti-affinity requirements for the EAS with other existing EAS on the target edge data network (EDN).

At operation 2, the ECSP provisioning MnS producer analyzes the deployment requirements to determine which EDN and how many EAS instance(s) are to be instantiated to satisfy the deployment requirements. The ECSP provisioning MnS producer downloads the EAS VNF software image from the software image location. The EDN may be selected either by considering the individual requirements or by grouping the multiple requirements as a single selection criteria.

At operation 3, the ECSP provisioning MnS producer creates an LCMProcess MOI with lcmProc.status="RUNNING" and lcmReqId=requestId to indicate the start of LCM process.

At operation 4, the ECSP provisioning MnS producer sends a notifyMOICreation of the LCMProcess MOI to notify the ASP of the status of LCM operation.

At operation 5, the ECSP provisioning MnS producer invokes the InstantiateNsRequest or UpdateNsRequest operation (see clause 7.3.3 and 7.3.5 in ETSI GS NFV-IFA 013) to request the NFVO via the Os-Ma-nfvo interface to instantiate a NS instance including the EAS VNF instance.

At operation 6, the NFVO sends a notification to the ECSP provisioning MnS producer indicating the result of instantiation procedure (see clause 7.3.3.4 and 7.3.5.4 of ETSI GS NFV-IFA 013).

At operation 7, if the VNF instantiation has been successful, then:

At operation 7.1, the ECSP provisioning MnS producer creates the MOI for the EASFunction IOC.

At operation 7.2, the ECSP provisioning MnS producer sends a notifyMOICreation to notify the ASP about the creation of EASFunction MOI.

At operation 8, the ECSP provisioning MnS producer processes the EAS instantiation results.

At operation 8.1, if all VNF instance(s) have been successfully instantiated, then:

At operation 8.1.1, the ECSP provisioning MnS producer creates the MOI for the EASRequirements IOC.

At operation 8.1.2, the ECSP provisioning MnS producer sends a notifyMOICreation to notify the ASP about the creation of the EASRequirement MOI.

At operation 8.1.3, the ECSP provisioning MnS producer returns a createMOI response with status="OperationSucceeded" to notify the ASP about the successful instantiation of EAS instance(s).

At operation 8.1.4, if all EAS VNF(s) were instantiated successfully, then:

At operation 8.1.4.1, the ECSP provisioning MnS producer sends a modifyMOIAttributes with a lcmProc.status="FINISHED" and lcmReqId=requestId to notify the ASP the EAS deployment was successful.

At operation 8.1.5, if not all EAS VNF(s) were instantiated successfully, then:

At operation 8.1.5.1, the ECSP provisioning MnS producer sends a modifyMOIAttributes with a lcmProc.status="PARTIALLY_FAILED" and lcmReqId=requestId to notify the ASP the EAS deployment was partially failed.

At operation 8.2, if no VNF instantiation succeeded, then:

At operation 8.2.1, the ECSP provisioning MnS producer sends a modifyMOIAttributes with a lcmProc.status="FAILED" and lcmReqId=requestId to notify the ASP about the unsuccessful instantiation of the EAS.

At operation 8.2.1, the ECSP provisioning MnS producer returns a createMOI response with status="OperationFailed".

Figure 6:
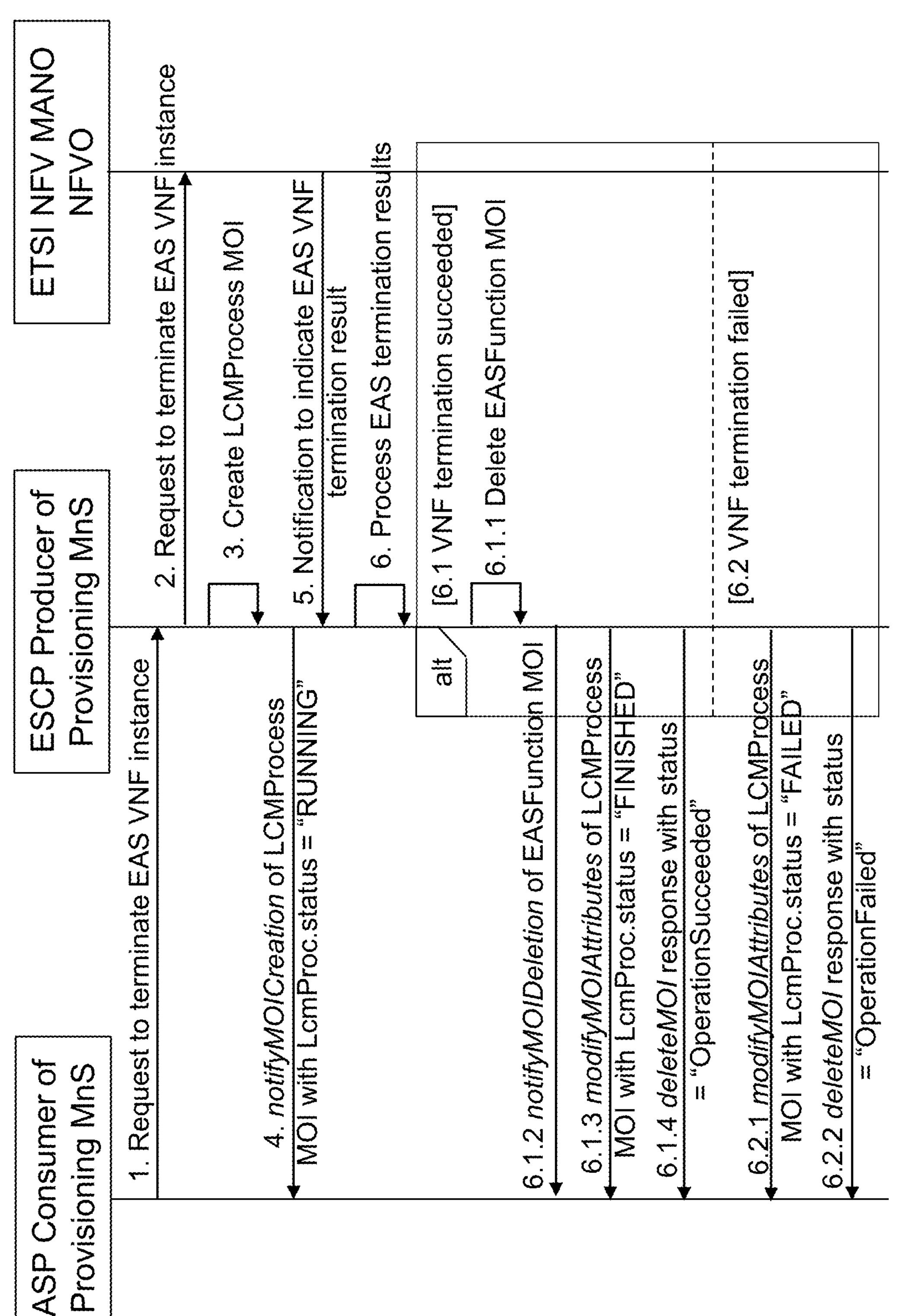
FIG. 6 illustrates EAS termination in accordance with some embodiments.

FIG. 6 illustrates EAS termination in accordance with some embodiments. Similar to the procedure in FIG. 5, the procedure in FIG. 6 describes how an ASP is able to consume a provisioning MnS to terminate the EAS. It is assumed that both the ASP and ECSP consumers have subscribed to the producer of provisioning MnS to receive notifications.

At operation 1, the ASP requests the ECSP provisioning MnS producer to start the EAS VNF termination by invoking the deleteMOI (see clause 11.1.1.4. in TS 28.532) operation for the EASFunction MOI.

At operation 2, the ECSP provisioning MnS producer invokes the TerminateNsRequest or UpdateNsRequestoperation (see clauses 7.3.7 and 7.3.5 in ETSI GS NFV-IFA 013) to request NFVO via the Os-Ma-nfvo interface to terminate the EAS VNF instance.

At operation 3, the ECSP provisioning MnS producer creates the LCMProcess MOI with lcmProc.status="RUNNING" and lcmReqId=requestId to indicate the start of the LCM process.

At operation 4, the ECSP provisioning MnS producer sends the notifyMOICreation of the LCMProcess to notify the ASP about the status of the LCM operation.

At operation 5, the NFVO sends the NS Lifecycle Change notification to the ECSP provisioning MnS producer indicating the result of the termination procedure (see clause 7.3.12 of ETSI GS NFV-IFA 013).

At operation 6, the ECSP provisioning MnS producer processes the EAS termination results.

At operation 6.1, if the VNF termination has been successful, then:

At operation 6.1.1, the ECSP provisioning MnS producer deletes the MOI for the EASFunction IOC. If all the related EASFunction MOIs have been deleted, the EASRequirement IOC is also deleted.

At operation 6.1.2, the ECSP provisioning MnS producer sends a notifyMOIDeletion to notify the ASP about the deletion of the EASFunction MOI.

At operation 6.1.3, the ECSP provisioning MnS producer sends a modifyMOIAttributes of the LCMProcess MOI with lcmProc.status="FINISHED" and lcmReqId=requestId to indicate the completion of the EAS termination.

At operation 6.1.4, the ECSP provisioning MnS producer returns a deleteMOI response with status="OperationSucceeded".

At operation 6.2, if the VNF termination failed, then:

At operation 6.2.1, the ECSP provisioning MnS producer sends a modifyMOIAttributes of LCMProcess MOI with lcmProc.status="FINISHED" and lcmReqId=requestId to notify the ASP about the unsuccessful termination of the EAS.

At operation 6.2.2, the ECSP provisioning MnS producer returns a deleteMOI response with status="OperationFailed".

Note that the names of the IOCs or attributes herein may be different from those indicated here. In addition, the information may be modeled and presented as a standalone IOC (e.g, LcmProcess IOC) and/or incorporated into an existing IOC (e.g., the process or progress information is incorporated in the EASRequirements IOC), in either case, the progress or progress information is provided for the LCM request with the corresponding EAS requirements.

Figure 7:
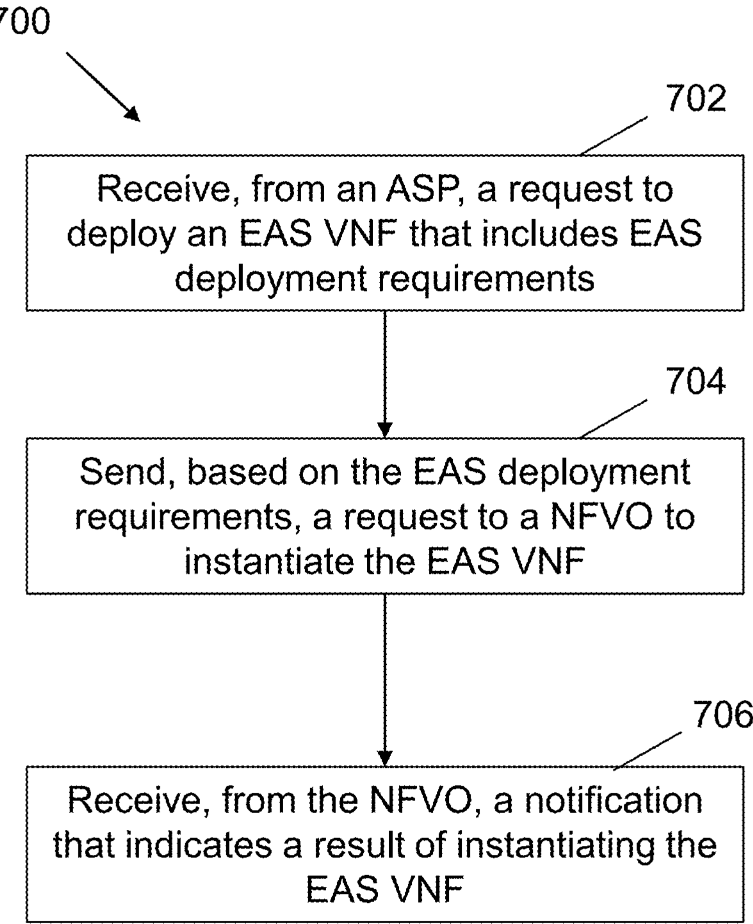
FIG. 7 illustrates a method of EAS instantiation in accordance with some aspects.

FIG. 7 illustrates a method of EAS instantiation in accordance with some aspects. In some embodiments, the electronic device(s), network(s), system(s), chip(s) or component(s), or portions or implementations thereof of the figures herein may be configured to perform one or more processes, techniques, or methods as described herein, or portions thereof. One such process is depicted in FIG. 7, which may be implemented using an ECSP producer of an MnS or portion thereof in some embodiments. For example, the process 700 may include, at operation 702, receiving, from an ASP, a request to deploy an EAS VNF that includes EAS deployment requirements. The process 700 further includes, at operation 704, sending, based on the EAS deployment requirements, a request to a NFVO to instantiate the EAS VNF. The process 700 further includes, at operation 706, receiving, from the NFVO, a notification that indicates a result of instantiating the EAS VNF. Other operations may be present but are not shown in FIG. 7.

EXAMPLES

Example 1 is an apparatus configured to operate as an edge computing service provider (ECSP) producer of provisioning management service (MnS), the apparatus comprising: processing circuitry to configure the ECSP producer of provisioning MnS to: receive, from a consumer, a request to deploy at least one edge application server (EAS) virtual network function (VNF) in a cloud, the request including EAS requirements for deployment of the at least one EAS VNF; send, to a European Telecommunications Standards Institute (ETSI) network function virtualization (NFV) management and orchestration (MANO), a request to instantiate the at least one EAS VNF; receive, from the ETSI NFV MANO, an indication of success of instantiation of the at least one EAS VNF; and send, to the consumer, the indication of success of instantiation of the at least one EAS VNF; and a memory configured to store the request.

In Example 2, the subject matter of Example 1 includes, wherein an Information Object Class (IOC) contains attributes of the EAS requirements that include: at least one service area where a user equipment (UE) is able to access an edge computing service provided by the at least one EAS VNF, software image information and virtual resource information for the at least one EAS VNF, Quality of Service (QoS) requirements for the at least one EAS VNF, service continuity requirements for the at least one EAS VNF, and affinity and anti-affinity requirements for the at least one EAS VNF with other existing EAS on a target edge data network (EDN).

In Example 3, the subject matter of Examples 1-2 includes, wherein the processing circuitry further configures the ECSP producer of provisioning MnS to: analyze the EAS requirements to determine which edge data network (EDN) and how many EAS instances are to be instantiated to satisfy the EAS requirements; and download an EAS VNF software image from a software image location.

In Example 4, the subject matter of Examples 1-3 includes, wherein the processing circuitry further configures the ECSP producer of provisioning MnS to: provide, to the consumer, lifecycle management (LCM) process information with a status of "RUNNING" and an identifier (ID) associated with the request to indicate a start of an LCM process of the at least one EAS VNF.

In Example 5, the subject matter of Examples 1-4 includes, wherein the processing circuitry further configures the ECSP producer of provisioning MnS to: invoke an InstantiateNsRequest or UpdateNsRequest operation to request a NFV Orchestrator (NFVO), via an Os-Ma-nfvo interface, to instantiate a network slice (NS) instance including the at least one EAS VNF; and receive, from the NFVO, a notification indicating a result of instantiation of the at least one EAS VNF.

In Example 6, the subject matter of Example 5 includes, wherein the processing circuitry further configures the ECSP producer of provisioning MnS to: determine, based on the notification, whether the instantiation has been successful; in response to a determination that the instantiation has been successful, create an EASFunction managed object instance (MOI) for an EASFunction Information Object Class (IOC) associated with the at least one EAS VNF; and send, to the consumer, a notifyMOICreation to notify the consumer about creation of the EASFunction MOI.

In Example 7, the subject matter of Examples 5-6 includes, wherein the processing circuitry further configures the ECSP producer of provisioning MnS to: determine, based on the notification, whether the instantiation has been successful for at least one EAS VNF instance of the at least one EAS VNF; in response to a determination that the instantiation for at least one EAS VNF instance has been successful, provide lifecycle management (LCM) process information in an MOI; and send, to the consumer: a notifyMOICreation to notify the consumer about creation of the MOI containing the LCM process information; and a createMOI response with a status of "OperationSucceeded" to notify the consumer about successful instantiation of the at least one EAS VNF instance.

In Example 8, the subject matter of Example 7 includes, wherein the processing circuitry further configures the ECSP producer of provisioning MnS to: in response to a determination that the instantiation of each of the at least one EAS VNF instance has been successful, send to the consumer a modifyMOIAttributes of the MOI containing the LCM process information with a status of "FINISHED" and an LCM request identification (ID) of a request ID of the request from the consumer to notify the consumer that deployment of the EAS VNF was successful; and in response to a determination that the instantiation of at least one of the at least one EAS VNF instance has been successful but at least another of the at least one EAS VNF instance has not been successful, send to the consumer a modifyMOIAttributes the MOI containing the LCM process information with a status of "PARTIALLY_FAILED" and the LCM request ID to notify the consumer that deployment of the EAS VNF partially failed.

In Example 9, the subject matter of Examples 7-8 includes, wherein the processing circuitry further configures the ECSP producer of provisioning MnS to: in response to a determination that no instantiation of the at least one EAS VNF instance has been successful, send to the consumer: a modifyMOIAttributes of the MOI containing the LCM process information with a status of "FAILED" and an LCM request identification (ID) of a request ID of the request from the consumer to notify the consumer that instantiation of the EAS VNF was unsuccessful; and a createMOI response with a status of "OperationFailed".

In Example 10, the subject matter of Examples 1-9 includes, wherein the processing circuitry further configures the ECSP producer of provisioning MnS to: receive, from the consumer, a request to start termination of the at least one EAS VNF; in response to reception of the request to start the termination, invoke an TerminateNsRequest or UpdateNsRequestoperation to request a NFV Orchestrator (NFVO) to terminate the at least one EAS VNF; receive, from the ETSI NFV MANO in response to the request to terminate the at least one EAS VNF, an indication of status of the termination; and send, to the consumer, the status of the termination.

In Example 11, the subject matter of Example 10 includes, wherein the processing circuitry further configures the ECSP producer of provisioning MnS to: create a managed object instance (MOI) with a status of "RUNNING" and an identifier (ID) associated with the request to start the termination to indicate a start of an LCM process of termination; and send, to the consumer, a notifyMOICreation of the MOI for notification of the status of the LCM process.

In Example 12, the subject matter of Examples 10-11 includes, wherein: the indication is provided by a network slice (NS) lifecycle change notification indicating a result of the termination; and the processing circuitry further configures the ECSP producer of provisioning MnS to determine, based on the notification indicating the result of the termination, whether the termination has been successful.

In Example 13, the subject matter of Example 12 includes, wherein the processing circuitry further configures the ECSP producer of provisioning MnS to, in response to a determination that the termination has been successful: delete an EASFunction managed object instance (MOI) for an EASFunction Information Object Class (IOC); and send to the consumer: a notifyMOIDeletion to notify the consumer about deletion of the EASFunction MOI, a modifyMOIAttributes of an MOI containing LCM process information with a status of "FINISHED" and an LCM request identification (ID) of a request ID associated with the request to start the termination to notify the consumer that the termination was completed, and a deleteMOI response with a status of "OperationSucceeded", the deleteMOI response associated with the MOI containing LCM process information.

In Example 14, the subject matter of Examples 12-13 includes, wherein the processing circuitry further configures the EC SP producer of provisioning MnS to, in response to a determination that the termination has failed, send to the consumer: a modifyMOIAttributes of an MOI containing LCM process information with a status of "FAILED" and an LCM request identification (ID) of a request ID associated with the request to start the termination to notify the consumer that the termination was unsuccessful, and a deleteMOI response with a status of "OperationFailed", the deleteMOI response associated with the MOI containing LCM process information.

In Example 15, the subject matter of Examples 12-14 includes, wherein the processing circuitry further configures the EC SP producer of provisioning MnS to, in response to a determination that the termination has been successful: determine whether all EASFunction MOIs related to the EAS VNF have been deleted; and in response to a determination that all of the EASFunction MOIs have been deleted, delete an EASRequirement IOC is also deleted.

Example 16 is an apparatus configured to operate as an edge computing service provider (ECSP) producer of provisioning management service (MnS), the apparatus comprising: processing circuitry to configure the EC SP producer of provisioning MnS to: receive, from a consumer, a request associated with lifecycle management (LCM) of an edge application server (EAS) virtual network function (VNF); in response to reception of the request, create a managed object instance (MOI) containing LCM process information during an LCM operation to notify a consumer regarding a status of the LCM operation; and send, to the consumer, a notification for creation of the MOI indicating a status of the LCM operation; and a memory configured to store the request.

In Example 17, the subject matter of Example 16 includes, wherein attributes of an Information Object Class (IOC) containing the LCM process information include: an attribute that indicates the status of the LCM operation; and an attribute that indicates an identifier of the request.

In Example 18, the subject matter of Examples 16-17 includes, wherein the processing circuitry further configures the ECSP producer of provisioning MnS to create at least one of a EASFunction IOC, which represents properties of the EAS VNF, or another IOC containing requirements to deploy the EAS VNF, the at least one of the EASFunction IOC or the other IOC including a request Id attribute that indicates an identifier of the request.

Example 19 is a computer-readable storage medium that stores instructions for execution by one or more processors of an edge computing service provider (ECSP) producer of provisioning management service (MnS), the one or more processors to configure the ECSP producer of provisioning MnS to, when the instructions are executed: receive, from a consumer, a request to deploy at least one edge application server (EAS) virtual network function (VNF) in a cloud, the request including EAS requirements for deployment of the at least one EAS VNF; send, to a European Telecommunications Standards Institute (ETSI) network function virtualization (NFV) management and orchestration (MANO), a request to instantiate the at least one EAS VNF; receive, from the ETSI NFV MANO, an indication of success of instantiation of the at least one EAS VNF; and send, to the consumer, the indication of success of instantiation of the at least one EAS VNF.

In Example 20, the subject matter of Example 19 includes, wherein an Information Object Class (IOC) contains attributes of the EAS requirements that include: at least one service area where a user equipment (UE) is able to access an edge computing service provided by the at least one EAS VNF, software image information and virtual resource information for the at least one EAS VNF, Quality of Service (QoS) requirements for the at least one EAS VNF, service continuity requirements for the at least one EAS VNF, and affinity and anti-affinity requirements for the at least one EAS VNF with other existing EAS on a target edge data network (EDN).

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to indicate one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. As indicated herein, although the term "a" is used herein, one or more of the associated elements may be used in different embodiments. For example, the term "a processor" configured to carry out specific operations includes both a single processor configured to carry out all of the operations as well as multiple processors individually configured to carry out some or all of the operations (which may overlap) such that the combination of processors carry out all of the operations. Further, the term "includes" may be considered to be interpreted as "includes at least" the elements that follow.

The Abstract of the Disclosure is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus configured to operate as an edge computing service provider (ECSP) producer of provisioning management service (MnS), the apparatus comprising:
- processing circuitry to configure the ECSP producer of provisioning MnS to:
  - receive, from a consumer, a request to deploy at least one edge application server (EAS) virtual network function (VNF) in a cloud, the request including EAS requirements for deployment of the at least one EAS VNF;
  - send, to a European Telecommunications Standards Institute (ETSI) network function virtualization (NFV) management and orchestration (MANO), a request to instantiate the at least one EAS VNF;
  - receive, from the ETSI NFV MANO, an indication of success of instantiation of the at least one EAS VNF; and
  - send, to the consumer, the indication of success of instantiation of the at least one EAS VNF; and
- a memory configured to store the request.

2. The apparatus of claim 1, wherein an Information Object Class (IOC) contains attributes of the EAS requirements that include:
- at least one service area where a user equipment (UE) is able to access an edge computing service provided by the at least one EAS VNF,
- software image information and virtual resource information for the at least one EAS VNF,
- Quality of Service (QoS) requirements for the at least one EAS VNF,
- service continuity requirements for the at least one EAS VNF, and affinity and anti-affinity requirements for the at least one EAS VNF with other existing EAS on a target edge data network (EDN).

3. The apparatus of claim 1, wherein the processing circuitry further configures the ECSP producer of provisioning MnS to:

analyze the EAS requirements to determine which edge data network (EDN) and how many EAS instances are to be instantiated to satisfy the EAS requirements; and download an EAS VNF software image from a software image location.

4. The apparatus of claim 1, wherein the processing circuitry further configures the ECSP producer of provisioning MnS to:

provide, to the consumer, lifecycle management (LCM) process information with a status of "RUNNING" and an identifier (ID) associated with the request to indicate a start of an LCM process of the at least one EAS VNF.

5. The apparatus of claim 1, wherein the processing circuitry further configures the ECSP producer of provisioning MnS to:

invoke an InstantiateNsRequest or UpdateNsRequest operation to request a NFV Orchestrator (NFVO), via an Os-Ma-nfvo interface, to instantiate a network slice (NS) instance including the at least one EAS VNF; and receive, from the NFVO, a notification indicating a result of instantiation of the at least one EAS VNF.

6. The apparatus of claim 5, wherein the processing circuitry further configures the ECSP producer of provisioning MnS to:

determine, based on the notification, whether the instantiation has been successful;

in response to a determination that the instantiation has been successful, create an EASFunction managed object instance (MOI) for an EASFunction Information Object Class (IOC) associated with the at least one EAS VNF; and send, to the consumer, a notifyMOICreation to notify the consumer about creation of the EASFunction MOI.

7. The apparatus of claim 5, wherein the processing circuitry further configures the ECSP producer of provisioning MnS to:

determine, based on the notification, whether the instantiation has been successful for at least one EAS VNF instance of the at least one EAS VNF;

in response to a determination that the instantiation for at least one EAS VNF instance has been successful, provide lifecycle management (LCM) process information in an MOI; and send, to the consumer:

a notifyMOICreation to notify the consumer about creation of the MOI containing the LCM process information; and a createMOI response with a status of "Operation Succeeded" to notify the consumer about successful instantiation of the at least one EAS VNF instance.

8. The apparatus of claim 7, wherein the processing circuitry further configures the ECSP producer of provisioning MnS to:

in response to a determination that the instantiation of each of the at least one EAS VNF instance has been successful, send to the consumer a modifyMOIAttributes of the MOI containing the LCM process information with a status of "FINISHED" and an LCM request identification (ID) of a request ID of the request from the consumer to notify the consumer that deployment of the EAS VNF was successful; and in response to a determination that the instantiation of at least one of the at least one EAS VNF instance has been successful but at least another of the at least one EAS VNF instance has not been successful, send to the consumer a modifyMOIAttributes the MOI containing the LCM process information with a status of "PARTIALLY_FAILED" and the LCM request ID to notify the consumer that deployment of the EAS VNF partially failed.

9. The apparatus of claim 7, wherein the processing circuitry further configures the ECSP producer of provisioning MnS to:

in response to a determination that no instantiation of the at least one EAS VNF instance has been successful, send to the consumer:

a modifyMOIAttributes of the MOI containing the LCM process information with a status of "FAILED" and an LCM request identification (ID) of a request ID of the request from the consumer to notify the consumer that instantiation of the EAS VNF was unsuccessful; and a createMOI response with a status of "OperationFailed".

10. The apparatus of claim 1, wherein the processing circuitry further configures the ECSP producer of provisioning MnS to:

receive, from the consumer, a request to start termination of the at least one EAS VNF;

in response to reception of the request to start the termination, invoke an TerminateNsRequest or UpdateNsRequestoperation to request a NFV Orchestrator (NFVO) to terminate the at least one EAS VNF;

receive, from the ETSI NFV MANO in response to the request to terminate the at least one EAS VNF, an indication of status of the termination; and send, to the consumer, the status of the termination.

11. The apparatus of claim 10, wherein the processing circuitry further configures the ECSP producer of provisioning MnS to:

create a managed object instance (MOI) with a status of "RUNNING" and an identifier (ID) associated with the request to start the termination to indicate a start of an LCM process of termination; and send, to the consumer, a notifyMOICreation of the MOI for notification of the status of the LCM process.

12. The apparatus of claim 10, wherein:

the indication is provided by a network slice (NS) lifecycle change notification indicating a result of the termination; and the processing circuitry further configures the ECSP producer of provisioning MnS to determine, based on the notification indicating the result of the termination, whether the termination has been successful.

13. The apparatus of claim 12, wherein the processing circuitry further configures the ECSP producer of provisioning MnS to, in response to a determination that the termination has been successful:

delete an EASFunction managed object instance (MOI) for an EASFunction Information Object Class (IOC); and send to the consumer:

a notifyMOIDeletion to notify the consumer about deletion of the EASFunction MOI, a modifyMOIAttributes of an MOI containing LCM process information with a status of "FINISHED" and an LCM request identification (ID) of a request ID associated with the request to start the termination to notify the consumer that the termination was completed, and a deleteMOI response with a status of "OperationSucceeded", the deleteMOI response associated with the MOI containing LCM process information.

14. The apparatus of claim 12, wherein the processing circuitry further configures the ECSP producer of provisioning MnS to, in response to a determination that the termination has failed, send to the consumer:

a modifyMOIAttributes of an MOI containing LCM process information with a status of "FAILED" and an LCM request identification (ID) of a request ID associated with the request to start the termination to notify the consumer that the termination was unsuccessful, and a deleteMOI response with a status of "OperationFailed", the deleteMOI response associated with the MOI containing LCM process information.

15. The apparatus of claim 12, wherein the processing circuitry further configures the ECSP producer of provisioning MnS to, in response to a determination that the termination has been successful:

determine whether all EASFunction MOIs related to the EAS VNF have been deleted; and in response to a determination that all of the EASFunction MOIs have been deleted, delete an EASRequirement IOC is also deleted.

16. A non-transitory computer-readable storage medium that stores instructions for execution by one or more processors of an edge computing service provider (ECSP) producer of provisioning management service (MnS), the one or more processors to configure the ECSP producer of provisioning MnS to, when the instructions are executed:

receive, from a consumer, a request to deploy at least one edge application server (EAS) virtual network function (VNF) in a cloud, the request including EAS requirements for deployment of the at least one EAS VNF;

send, to a European Telecommunications Standards Institute (ETSI) network function virtualization (NFV) management and orchestration (MANO), a request to instantiate the at least one EAS VNF;

receive, from the ETSI NFV MANO, an indication of success of instantiation of the at least one EAS VNF; and send, to the consumer, the indication of success of instantiation of the at least one EAS VNF.

17. The medium of claim 16, wherein an Information Object Class (IOC) contains attributes of the EAS requirements that include:

at least one service area where a user equipment (UE) is able to access an edge computing service provided by the at least one EAS VNF, software image information and virtual resource information for the at least one EAS VNF, Quality of Service (QoS) requirements for the at least one EAS VNF, service continuity requirements for the at least one EAS VNF, and affinity and anti-affinity requirements for the at least one EAS VNF with other existing EAS on a target edge data network (EDN).

* * * * *